United States Patent [19]
Chambers

[11] Patent Number: 5,482,410
[45] Date of Patent: Jan. 9, 1996

[54] DRILL AND COUNTERSINK ASSEMBLY AND METHOD

[76] Inventor: Frank J. Chambers, P.O. Box 1767, Ferndale, Wash. 98248

[21] Appl. No.: 370,663

[22] Filed: Jan. 10, 1995

[51] Int. Cl.⁶ .................... B23B 35/00; B23B 51/08
[52] U.S. Cl. .................... 408/1 R; 408/191; 408/224
[58] Field of Search .................... 408/1 R, 186, 408/189, 196, 200, 203, 223, 224, 191, 225, 117, 118, 239 R

[56] References Cited

U.S. PATENT DOCUMENTS 2,429,375  10/1947  Smith .................... 408/224

FOREIGN PATENT DOCUMENTS 3307727  10/1983  Germany .................... 408/225
1166912  7/1985  U.S.S.R. .................... 408/200

*Primary Examiner*—Daniel W. Howell
*Attorney, Agent, or Firm*—Robert B. Hughes; Hughes, Multer & Schacht

[57] ABSTRACT

A drill and countersink tool having a drill bit member fixedly attached to a mounting member. The mounting member has exterior threads by which it is ajustably mounted in a countersink member in a manner that the drill bit extends downwardly from the countersink member. A lock nut is threaded onto the mounting member to come into locking engagement with the countersink member. By loosingly the lock nut, the position of the drill bit and the mounting member can be adjusted for different drill lengths.

14 Claims, 3 Drawing Sheets

FIG. 1
PRIOR ART
FIG. 2
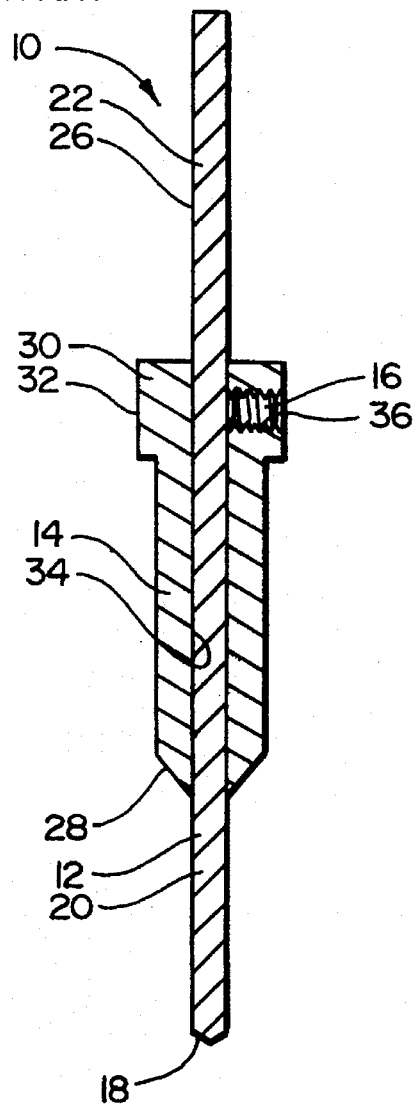
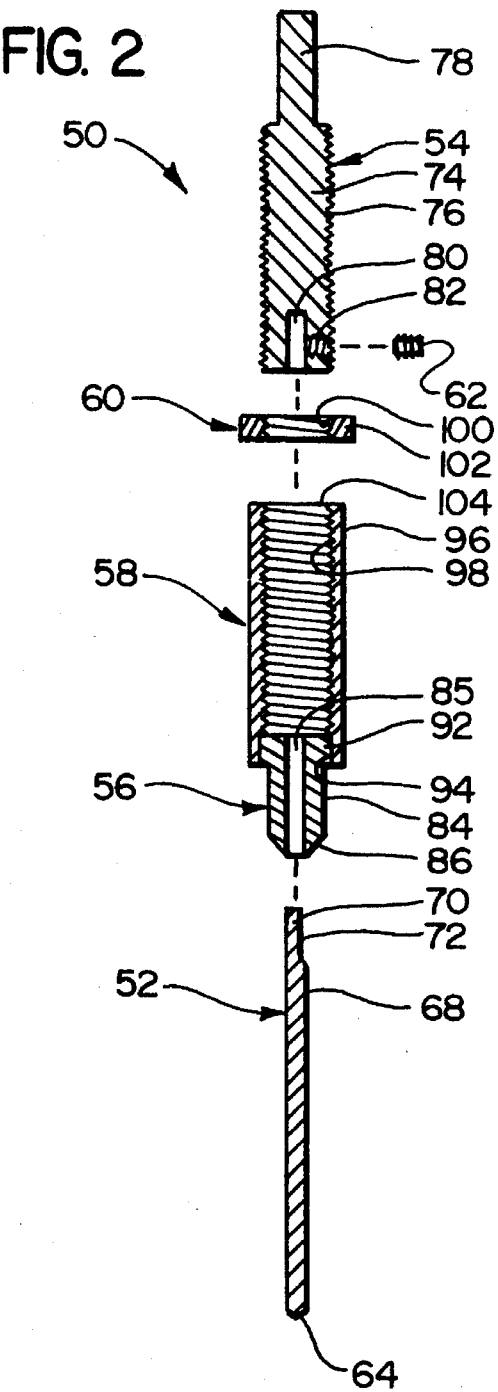

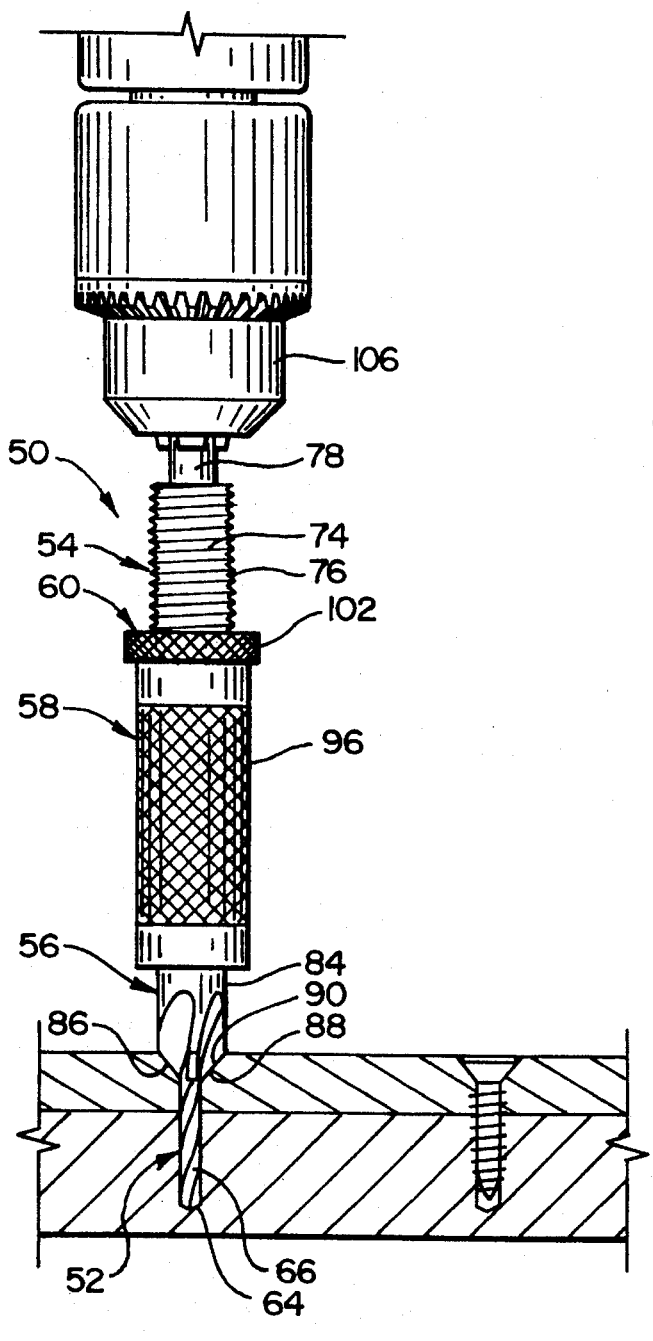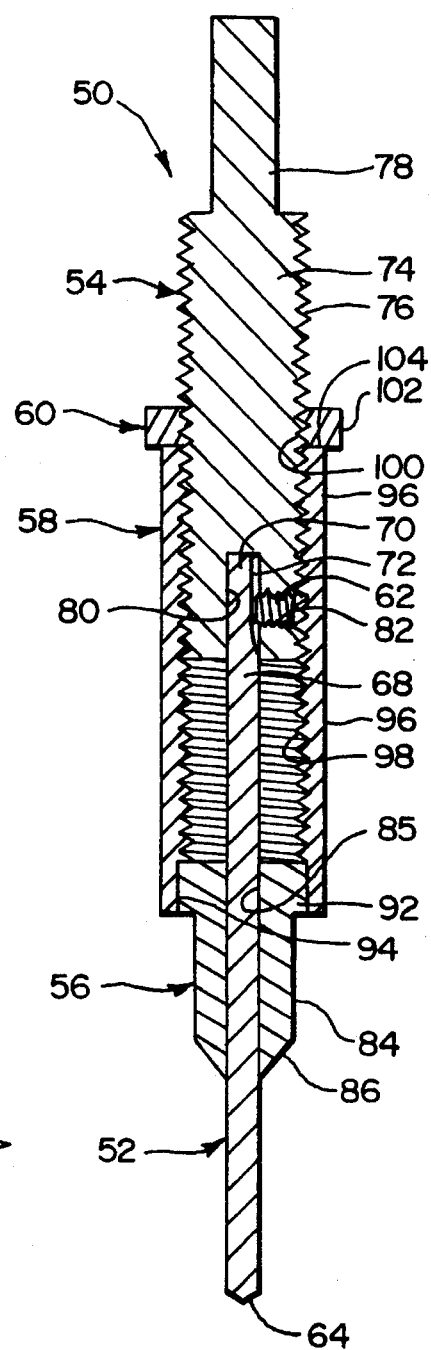

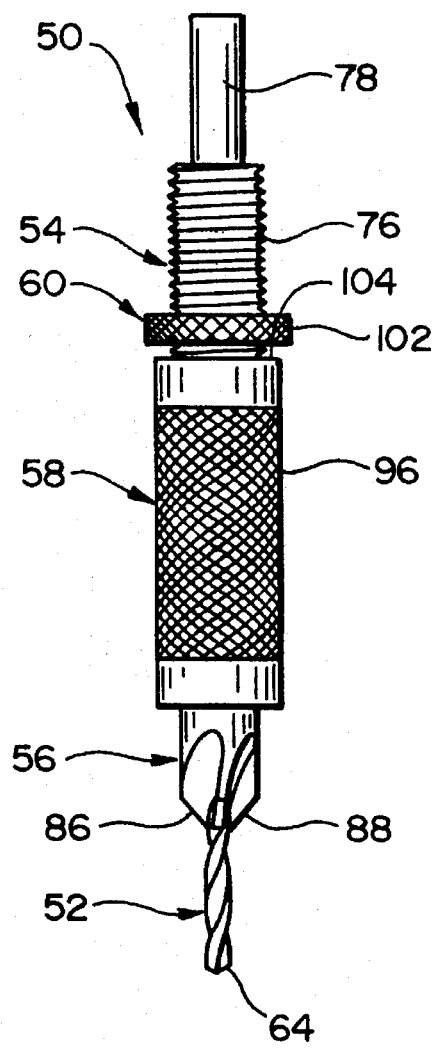
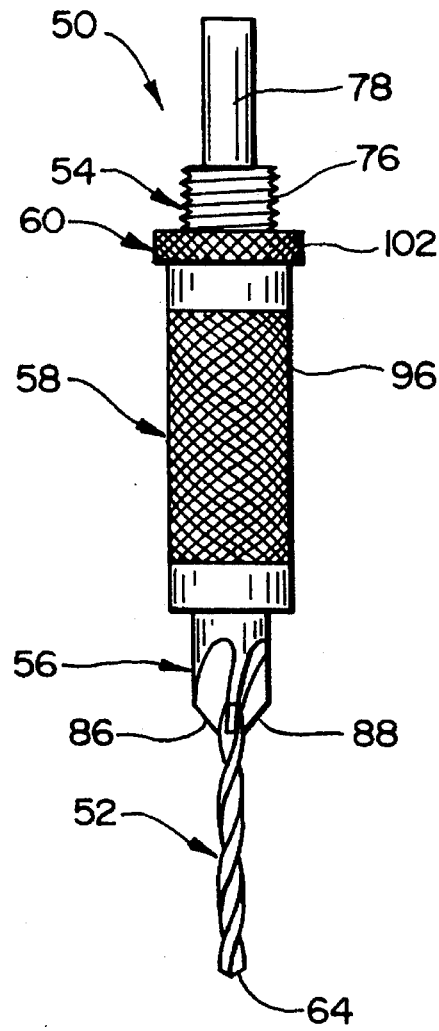

DRILL AND COUNTERSINK ASSEMBLY AND METHOD

FIELD OF THE INVENTION

The present invention relates to a drill and countersink assembly adapted to form a drilled hole with a countersink at the end thereof, and also a method of accomplishing the same. More specifically, this invention relates to such an assembly and method where the assembly can both be conveniently assembled and adjusted to form the drill hole at varying depths.

BACKGROUND ART

In the woodworking industry and elsewhere, it has long been a practice to drill a hole into a substrait (e.g. wood) where the end of the drilled hole is formed with a countersink (i.e. a frusto conical recess). This is commonly done to provide a pre-drilled hole for a screw having a countersunk head.

One method of accomplishing this is simply to drill the cylindrical drilled hole, and follow this by a second operation where the countersink forming member (i.e. one having a frusto conical cutting edge) is provided with a forwardly extending cylindrical shaped locating member to act as a locating member or pilot member. Then the pilot member is inserted into the hole (which is a pilot hole) to locate the countersink cutting member to form the centered countersunk recess at the top of the drill hole.

It has also been known in the prior art to provide a single drill and countersink assembly to accomplish this same task in one operation. This is done by providing first an elongate generally cylindrical drill member having three parts. First, there is the end drill tip; second a fluted shank portion; and third, an end mounting cylindrical section which can fit into the chuck of a drill. There is then provided a second countersink member which has a forward end at which there is a frusto conically shaped countersink cutting head. This countersink member is formed with a cylindrical through hole adapted to engage the fluted shank portion of the drill member. The drill member is inserted into the central opening in the countersink member to a depth so that the drilled portion extends beyond the countersink member to the appropriate depth. Then a set screw is inserted into a laterally threaded opening of the countersink member to bear against the fluted shank of the drill member to hold the drill member in place relative to the countersink member.

Also, a search of the patent literature has disclosed a number of U.S. patents, these being the following:

U.S. Pat. No. 3,794,438 (Knutson) discloses a drill member 1 having a shank, and there are two separate countersink elements 2 which fit in side by side relationship against the shank of the drill. These two countersink members 2 are pressed inwardly against the shank by means of a tightening member having a bottom section 4a with a frusto-conical surface that engages the frusto-conical surfaces of the members 2. Then there is a top section 5 having exterior threads which engages internal threads of the bottom section 4a. Thus, as the member 5 is threaded into the member 4a, the frusto-conical surface of the member 4a presses the two countersink sections 2 together.

U.S. Pat. No. 2,918,954 (Miller) discloses a drill member 40 which is inserted into an intermediate member 30 and held there by means of a set screw 42. The intermediate member 30 is in turn held in a shank 12 by means of another set screw 34.

U.S. Pat. No. 2,705,515 (Walker) shows a drill with a burnishing attachment. The drill 70 is secured by a set screw 72 in an adapted 71.

U.S. Pat. No. 2,486,363 (Purvis) shows a drill which fits within a center opening in a cleaning member C having bristles 10. A set screw 18 engages the shank portion 7 of the drill to hold in the cleaning member C.

U.S. Pat. No. 1,479,325 (Schubnel) shows a chuck where there is a drill 6 held by jaws 8 that have countersink-like cutting edges 9 at the lower ends thereof. The chuck body 7 has at the lower end an interior frusto-conical surface to grasp the jaws 8. There is a nut 18 which engages the chuck body the block 17 downwardly to in turn move the jaws 8 downwardly and into clamping relationship.

U.S. Pat. No. 1,229,565 (Ahlgren) shows a drill and countersink assembly where the countersink member 1 has upwardly extending arms formed by longitudinal splits 5 in the upper portion of the shank 3. The countersink member 1, with the drill being mounted therein is held by what appears to be a conventional chuck so as to press the upper arms 3 inwardly to grasp the drill.

U.S. Pat. No. 631,572 (Judson) shows what is called a reaming attachment for a bit, and this comprises a tubular reaming attachment which fits over a drill, with this being held in place by a set screw.

U.S. Pat. No. 332,308 (Valentine) shows a drill held in a countersink member with resilient arms to hold the drill.

SUMMARY OF THE INVENTION

The drill bit/countersink assembly of the present invention comprises a drill bit member, a drill bit mounting member, a countersink member, and a releasable locking member.

The drill bit member has a lower drilling portion, an intermediate shank portion, and an upper end mounting portion.

The drill bit mounting member has a longitudinal center opening to receive at least the upper mounting portion of the drill bit member and to hold the drill bit member fixedly in the drill bit mounting member, with the lower drill bit portion extending downwardly from the drill mounting member. The drill bit mounting member has a cylindrical, threaded outside surface.

The countersink member comprises first a lower countersink portion having countersink cutting edges at a lower end thereof, and a through opening sized and positioned to receive the drill bit member therein. Also, there is an upper countersink mounting portion having a longitudinal recess with an interiorly facing cylindrical threaded surface to engage in threaded relationship the threaded outer surface of the drill mounting member.

There is a releasable locking member which releasably holds the drill bit mounting member and the countersink member in fixed position relative to one another. In the preferred form this locking member is a nut member threaded mounted on the exterior threads of the drill mounting member and arranged to be rotated to engage the countersink member in a manner to fixedly position the drill mounting member relative to the countersink member.

In the preferred form, there is a set screw extending through a lateral opening leading from an outside surface of said drill bit mounting member to the longitudinal center opening of the drill bit mounting member to engage the upper mounting portion of the drill bit member.

Also, in the preferred version, the upper portion of the drill bit member has a recessed side surface to engage the set screw and thus better prevent rotation of the drill bit member in the drill bit mounting member.

The specific preferred configuration of the drill bit mounting member is that the cylindrical threaded outer surface of the drill bit mounting member has a diameter greater than that of the drill bit member. Also, the through opening of the countersink member is sized to closely engage the sidewall of the drill bit member. An inside diameter of the interiorly facing threaded surface of the countersink mounting portion has a diameter greater than a diameter of the drill bit member, so as to be spaced outwardly therefrom. Thus, when the drill bit mounting member is spaced upwardly from the lower countersink portion, the drill bit member is held in position at its upper end by the drill bit mounting member and at lower portion thereof by the lower countersink portion so as to be properly aligned in the assembly.

Also, desirably the lock nut has an outer circumferential gripping surface and the upper countersink mounting portion also has an outer circumferential gripping surface. The gripping surfaces are positioned adjacent to one another in a manner that these can simultaneously be manually grasped by a person and rotated together relative to the drill bit mounting member. Thus, the lock nut can be rotated only a short distance from the upper countersink mounting portion, and the lock nut member and the countersink mounting portion can be grasped simultaneously, while the drill bit mounting member is rotated for longitudinal adjustment of the drill bit assembly.

In the method of the present invention, there is provided a drill bit member as described above. The drill bit member is fixedly mounted into the drill bit mounting member by inserting at least the upper end mounting portion into the longitudinal center opening of the mounting member. Then the drill bit mounting bit with the drill bit member therein is inserted into the countersink member. The drill bit mounting member is rotated relative to the countersink member so as to thread the drill bit mounting member into the countersink member a desired distance, with the drill bit mounting member extending through the lower countersink portion and being supported laterally thereby.

The releasable lock nut is threaded onto the drill bit mounting member until the lock nut engages the upper countersink mounting portion in retaining relationship.

When it is desired to change the position of the drill bit relative to the countersink member, the lock nut is threaded in a manner to take it out of locking engagement with the countersink mounting portion, and the drill bit mounting member is rotated relative to the lock nut and the countersink member to change the position of the drill bit member. After that, the lock nut is again rotated to place it in locking relationship with the countersink member.

Other features will become apparent from the following detailed description.

BRIEF DESCRIPTION OF THE DRAWINGS

FIG. 1 is a longitudinal sectional view of a prior art drill and countersink device;

FIG. 2 is an exploded view, showing the components of the drill and countersink assembly of the present invention;

FIG. 3 is a side elevational view of the assembly of the present invention positioned in a drill chuck and forming a drill hole and countersink;

FIG. 4 is a longitudinal section view of the drill and countersink assembly of the present invention;

FIG. 5 is a side elevational view of the present invention, with the lock nut in its release position;

FIG. 6 is a view similar to FIG. 5, but showing the countersink member and the nut moved upwardly, with the lock nut now in its retaining position relative to the countersink member.

DESCRIPTION OF THE PREFERRED EMBODIMENT

It is believed that a clearer understanding of the present invention will be attained if, prior to presenting a description of the present invention, there is at least a brief disclosure of prior art drill bit/countersink assembly mentioned previously under "Background of the Invention." Then there will be a description of the preferred embodiment of the present invention.

With reference to FIG. 1, there is shown a prior art drill bit/countersink assembly 10 which has been used for a number of years. This comprises three components, namely a drill bit member 12, a countersink member 14, and a set screw 16 arranged to lock the drill bit member 12 and countersink member 14 to one another in a desired position.

The drill bit member 12 has the overall configuration of an elongate cylindrical member and comprises three parts, namely a lower end drill tip 18, a fluted shank portion 20, and an upper end mounting portion 22 adapted to fit into a drill chuck. The drill tip portion 18 generally has two or more cutting edges. The fluted shank portion 20 has a side wall being formed with suitable helical grooves or flutes to carry away the material which is being removed (such helical grooves not being shown for ease of illustration).

The upper end portion 22 of the drilling member 12 has its side wall 26 of a conventional cylindrical configuration or is otherwise formed so as to fit into a chuck or other holding member of a drilling member.

The countersink member 14 has a lower frusto conical cutting portion 28 having two or more slanting cutting edges (not shown for ease of illustration) that cut a countersink recess. The upper end 30 of the countersink member 14 has a slightly expanded diameter with a sidewall portion 32 which can if desired have a knurled surface. The countersink member 14 is formed with a longitudinally extending through bore 34 to receive the drill bit member 14.

The set screw 16 is exteriorly threaded and fits in a threaded through opening 36 which is radially oriented relative to the longitudinal center axis of the drill bit member 12.

In operation, the drill bit/counter bore assembly 10 is assembled simply by inserting the drill bit member 14 into the upper end of the bore 34 formed in the countersink member 14, and moving it downwardly until the drill end tip 24 has reached the desired position relative to the counter sink member 14. Then to hold the drill bit member 12 and countersink member 14 in that position, the set screw 16 is rotated to press the inner end of the set screw into engagement with the fluted portion 20 of the drill bit member 12.

When it is desired to adjust the position of the drill member 12 relative to the countersink member 14 so as to change the depth of the hole being drilled, the set screw 16 is retracted a short distance, and then the drill member and the countersink member 14 are moved relative to one another upwardly or downwardly. Then the set screw 16 is rotated to come into engagement with the sidewall of the drill member 12.

After the set screw 16 has been brought into and out of engagement with the drill member 12 a number of times, it sometimes happens that the flutes on the drill member become damaged. Also the set screw 16 may not engage the fluted portion securely.

The apparatus of the present invention will now be described with reference to FIGS. 2 through 6.

As shown in FIG. 2, there is shown the drill bit assembly 50 of the present invention. This comprises a drill bit member 52, a drill bit mounting member 54, a counter sink member 56, a countersink mounting member 58, a positioning locking member 60, and a drill bit retaining member 62.

The drill bit member 52 has an elongate cylindrical configuration and has a lower cutting end 64 with two or more cutting edges. The cylindrical sidewall of the drill bit member 52 is formed with two or more helical grooves 66 to carry away the material being cut. The upper cylindrical sidewall portion 68 of the member 52 is or may be a cylindrical flat wall, and the upper end 70 has a longitudinally extended flattened surface portion 72 adapted to engage the retaining set screw 62.

The mounting member 54 has a main body portion 74 with a cylindrical sidewall that is threaded at 76 along its entire length. At the upper end of the main body portion, there is a cylindrical drill mounting portion 78 which is adapted to fit into a chuck of a drilling device. At the lower end of the body portion 74, there is formed a longitudinally aligned socket 80 which receives the upper end 70 of the drill bit member 52. The set screw 62 threads into a radially extending threaded opening 82 to fit against the flat surface 72 and hold the drill bit member 52 fixedly to the mounting member 54.

The countersink member 56 has an overall cylindrical configuration with a cylindrical sidewall 84, with a cylindrical bore 85 to receive the drill member 52. At its lower end, it has a generally frusto conical surface 86 with two or more slanted cutting edges 88 adapted to cut a countersunk recess 90 (as shown in FIG. 3.) The countersink member 56 has an upper end mounting portion 92 having a diameter moderately larger than that of the main countersink portion 84, and the cylindrical sidewall of this upper portion 92 fits snugly against an interior facing cylindrical sidewall 94 formed at the lower end of the countersink mounting member 58.

The countersink mounting member 58 is generally cylindrically shaped and has an outer cylindrical sidewall 96 which (as shown in FIG. 3) is knurled about most of its surface to permit it to be conveniently gripped. The countersink mounting member 58 is formed with a longitudinally aligned bore 98 which is interiorly threaded to match the threads 76 of the mounting member main body portion 74. Thus, the countersink mounting member 58 can be threaded onto the mounting member 54.

The aforementioned positioning locking member 60 is conveniently made as a lock nut having interior threads 100 and a knurled sidewall 102 to facilitate the gripping of the lock nut retaining member 60.

Desirably, the countersink member 56 is press fitted into the countersink mounting member 58 so that the upper end mounting portion 92 fits snugly within the sidewall 90 at the lower end of the mounting member 58. For further operation, these two members 56 and 58 can remain locked together, until such time as it would be necessary to replace the countersink portion 56. Alternatively, the countersink member 56 and the mounting member 58 could be replaced as a unit when the need arises.

To describe the operation of the present invention, there will first be described, with reference to FIG. 2, the method of assembling the several components.

Initially, the drill bit member 52 has its upper end 70 inserted into the socket 80 formed in the mounting member 54, so that the flattened surface 72 is facing the lateral retaining opening 82. Then the retaining screw 62 is threaded into the side threaded opening 82 and rotated until it comes into firm engagement with the surface 72 of the drill bit 52. As will be evident from the description below, there is no need to thread and unthread this set screw 62 for different adjustments. Thus, for all practical purposes, the set screw 62 can be put firmly in place and will not have to be dislodged until the drill bit member 52 becomes dull or broken until it needs to be replaced.

Then the countersink mounting member 58 is moved into a position so as to be aligned with, and immediately below, the drill bit mounting member 54, and the member 58 is threaded onto the drill bit member 54. As this occurs, the drill bit member 52 is positioned so that it extends through the center bore 85 formed in the countersink member 56. The amount which the drill bit member 52 extends beyond the countersink member 56 depends upon the depth to which the countersink mounting member 58 is threaded onto the drill bit mounting member 54.

Let is now be assumed that the threading of the countersink mounting member 58 onto the drill bit mounting member 54 has continued until the drill bit member 52 is at the desired position, as shown in FIG. 5. Then the lock nut 62 is threaded onto the threads 76 on the sidewall of the mounting member 54 until it comes into snug engagement with the upper surface 104 of the countersink mounting member 58.

It will be noted that when the drill bit mounting member 54 is at a position further upwardly relative to the countersink mounting member 58, the upper end 70 of the drill bit member 52 is supported and precisely positioned by the drill bit mounting member 54, and the intermediate portion of the drill bit member is precisely positioned by the interior sidewall 85 forming the bore through the countersink member 56.

With the above steps being accomplished, the drill bit/countersink assembly 50 now is assembled as a single unit with the components fixedly connected to one another. At this time, the assembly 50 can be used in a conventional drilling apparatus as shown in FIG. 3 where the upper end mounting portion 78 can be fitted into a drill chuck 106 of conventional configuration. Then a drilling operation can be accomplished in the usual manner as shown in FIG. 3.

Let it now be assumed that there is a need to adjust the position of the drill bit member 52 relative to the countersink portion 56 to dig the drilled hole to a greater depth. It is a simple matter to simply back off the lock nut 62 a half turn or so, as shown in FIG. 5, and the person can easily grasp the knurled side surface 102 of the nut 62 and the knurled side surface 96 of the countersink retaining member 56 between the thumb and the forefinger so that these remain in the same position relative to one another. Then the person simply rotates the drill bit mounting member 54 (either manually or by rotating the drill if the member is mounted in the drill chuck) so that the drill member moves further down from the countersink mounting member 56 or is retracted into the countersink member 56, as shown in FIG. 5. When the drill bit member 52 reaches the desired position, then the lock nut 60 is simply rotated down into snug retaining engagement so as to fixedly position the two mounting members 54 and 56 relative to one another, as shown in FIG. 6.

Another significant feature of the present invention is that the several component parts are configured in such a way that these can be easily and economically manufactured. Only the drill bit member 52 and the countersink member 56 (both of which have cutting edges) need be made of a higher quality steel (e.g. a high speed steel or a case hardened steel), and the design of these components can be substantially conventional, thus being able to be procured or made at a lower cost. The drill bit mounting member 54 can be easily formed from conventional cylindrical stock made of mild steel and then cut with exterior threads. In like manner, the countersink mounting member 58 can be made of mild steel tubular stock and then be cut with interior threads. The locking member 60 can also be made of mild steel from tubular stock. The drill bit retaining member 62 can be in the form of a conventional set screw.

What is claimed:

1. A drill bit/countersink assembly comprising:
  a. a drill bit member having a lower drilling portion, an intermediate shank portion and an upper end mounting portion;
  b. a drill bit mounting member having a longitudinal center opening to receive at least the upper mounting portion of the drill bit member and to hold the drill bit member fixedly in the drill bit mounting member with the lower drill bit portion extending downwardly from the drill mounting member, said drill bit mounting member having a cylindrical, threaded outer surface.
  c. a countersink member comprising:
    i. a lower countersink portion having countersink cutting edges at a lower end thereof and a through opening sized and positioned to receive the drill bit member therein;
    ii. an upper countersink mounting portion having a longitudinal recess with an interiorly facing cylindrical threaded surface to engage in threaded relationship the threaded outer surface of the drill mounting member;
  d. a releasable locking member arranged to releasably engage the drill mounting member and the countersink member in a manner to fixedly position the drill mounting member relative to the countersink member, and also to release the drill mounting member and the countersink member from fixed engagement with one another.

2. The assembly as recited in claim 1, wherein said locking member is a lock nut member threadedly mounted on the exterior threads of the drill mounting member so as to be able to rotate into and out of locking engagement.

3. The assembly as recited in claim 2, wherein said lock nut has an outer circumferential gripping surface and said upper countersink mounting portion also has an outer circumferential gripping surface, said gripping surfaces being positioned adjacent to one another in a manner that these can simultaneously be manually grasped by a person and rotated together relative to said drill bit mounting member, whereby said lock nut can be rotated only a short distance from the upper countersink mounting portion, the lock nut member and the countersink mounting portion can be grasped simultaneously, while the drill bit mounting member is rotated for longitudinal adjustment of the drill bit assembly.

4. The assembly as recited in claim 1, wherein there is a set screw extending through a lateral opening leading from an outside surface of said drill bit mounting member to the longitudinal center opening of the drill bit mounting member to engage the upper mounting portion of the drill bit member.

5. The assembly as recited in claim 4, wherein the upper mounting portion of the drill bit member has a recessed side surface to engage the set screw and thus better prevent rotation of the drill bit member in the drill bit mounting member.

6. The assembly as recited in claim 1, wherein the cylindrical threaded outer surface of the drill bit mounting member has a diameter greater than that of the drill bit member, and the through opening of the countersink member is sized to closely engage the sidewall of the drill bit member, and an inside diameter of the interiorly facing threaded surface of the countersink mounting portion having a diameter greater than a diameter of the drill bit member, so as to be spaced outwardly therefrom, whereby when said drill bit mounting member is spaced upwardly from said lower countersink portion, said drill bit member is held in position at its upper end by said drill bit mounting member and at a lower portion thereof by the lower countersink portion so as to be properly aligned in the assembly.

7. A drill bit countersink assembly comprising:
  a. a drill bit member having an elongate configuration with a substantially uniform cylindrical sidewall along substantially its entire length, said drill bit member having a lower drilling portion, an intermediate shank portion and an upper end mounting portion;
  b. a drill bit mounting member having a longitudinal center opening to receive at least the upper mounting portion of the drill bit member and to hold the drill bit member fixedly in the drill bit mounting member, said drill bit mounting member having a cylindrical threaded outer surface having a diameter greater than that of the drill bit member;
  c. a set screw extending through a laterally extending threaded through opening communicating with the longitudinal center opening of the drill bit mounting member to engage the upper end mounting portion of the drill bit member in retaining engagement;
  d. a countersink member comprising:
    i. a lower countersink portion having countersink cutting edges at a lower end thereof and a through longitudinally extending opening sized and positioned receive the drill bit member and in close engagement therewith;
    ii. an upper countersink mounting portion having a longitudinally aligned recess with an interior facing cylindrically threaded surface having a diameter greater than that of the through opening of the lower countersink portion, and arranged to engage in threaded relationship the threaded outer surface of the drill mounting member;
  e. a releasable lock nut member threadedly mounted on the exterior threads of the drill mounting member and arranged to be rotated to engage the countersink member in a manner to fixedly position the drill mounting member relative to the countersink member.

8. The assembly as recited in claim 7, wherein said lock nut has an outer circumferential gripping surface and said upper countersink mounting portion also has an outer circumferential gripping surface, said gripping surfaces being positioned adjacent to one another in a manner that these can simultaneously be manually grasped by a person and rotated together relative to said drill bit mounting member, whereby said lock nut can be rotated only a short distance from the upper countersink mounting portion, the lock nut member and the countersink mounting portion can be grasped simultaneously, and the drill bit mounting member is rotated for longitudinal adjustment of the drill bit assembly.

9. A method of utilizing and adjusting a drill bit/countersink assembly, said method comprising:

a. providing a drill bit member having a lower drilling portion, an intermediate shank portion and an upper end mounting portion;

b. fixedly mounting said drill bit member to a drill bit mounting member by inserting at least the upper end mounting portion into a longitudinal center opening of the mounting member, with the lower drill bit portion extending downwardly from the drill bit mounting member, said drill bit mounting member being characterized in that it has an outer cylindrical threaded surface;

c. providing a countersink member comprising:
   i. a lower countersink portion having countersink cutting edges at a lower end thereof and a through opening sized and positioned to receive the drill bit member therein in close fitting relationship;
   ii. an upper countersink mounting portion having a longitudinal recess with an interiorly facing cylindrical threaded surface matching the threaded outer surface of the drill bit mounting member;

d. inserting the drill bit mounting member with the drill bit member therein into the countersink member and rotating the drill bit mounting member relative to the countersink member so as to thread the drill bit mounting member into the countersink member a desired distance, with the drill bit member extending through the lower countersink portion and being supported laterally thereby;

e. utilizing a releasable locking means to hold said drill bit mounting member and said countersink member in a fixed position relative to one another.

10. The method as recited in claim 9, wherein a set screw is threaded into a lateral opening leading from an outside surface of said drill bit mounting member to the longitudinal center opening of the drill bit mounting member to engage the upper mounting portion of the drill bit member.

11. The method as recited in claim 10, wherein the upper mounting portion of the drill bit member has a recessed side surface to engage the set screw and thus better prevent rotation of the drill bit member in the drill bit mounting member.

12. The method as recited in claim 9, wherein the cylindrical threaded outer surface of the drill bit mounting member is sized to have a diameter greater than that of the drill bit member, and the through opening of the countersink member is sized to closely engage the sidewall of the drill bit member, with an inside diameter of the interiorly facing threaded surface of the countersink mounting portion having a diameter greater than a diameter of the drill bit member, so as to be spaced outwardly therefrom, said method being further characterized so that when said drill bit mounting member is spaced upwardly from said lower countersink portion, said drill bit member is held in position at its upper end by said drill bit mounting member and at a lower portion thereof by the lower countersink portion so as to be properly aligned in the assembly.

13. The method as recited in claim 9, wherein the locking member is a lock nut which is threadedly mounted to said countersink mounting member.

14. The method as recited in claim 13, wherein said lock nut has an outer circumferential gripping surface and said upper countersink mounting portion also has an outer circumferential gripping surface, said gripping surfaces being positioned adjacent to one another said method further comprising adjusting the position of the drill bit member by simultaneously manually grasping and rotating the lock nut and the countersink member together, and then rotating the lock nut into locking engagement with the countersink member, relative to said drill bit mounting member.

* * * * *